May 20, 1958 C. S. WHITE 2,835,521
BALL JOINT BEARING STRUCTURE
Filed Dec. 8, 1953 3 Sheets-Sheet 1

Inventor
Charles S. White
By Wilson, Pedrow and Gainer
Attorneys

May 20, 1958  C. S. WHITE  2,835,521
BALL JOINT BEARING STRUCTURE
Filed Dec. 8, 1953  3 Sheets-Sheet 2

Inventor
Charles S. White
By Wilson, Pedrow and Gainer
Attorneys

May 20, 1958     C. S. WHITE     2,835,521
BALL JOINT BEARING STRUCTURE
Filed Dec. 8, 1953     3 Sheets-Sheet 3

Inventor
Charles S. White
By Wilson, Redrow and Gainer
Attorneys

2,835,521

Patented May 20, 1958

2,835,521

BALL JOINT BEARING STRUCTURE

Charles S. White, Dearborn, Mich.

Application December 8, 1953, Serial No. 396,893

10 Claims. (Cl. 287—90)

This invention relates to an improved ball joint bearing means and more particularly to such a bearing means for use in automotive suspension systems.

Ball joint bearing means are well known structures and have been proposed in the past for various uses including their use in automobile suspension systems but such heavy duty ball joint bearing constructions have always been quite expensive in the past due to the necessity of making all of the cooperating parts to precision tolerances in order to insure proper fits.

The present invention is concerned with a novel ball joint structure and relates particularly to a relatively inexpensive bearing means for an automotive suspension which retains the known charcteristics of ball joints used for this purpose, while incorporating several additional functions.

The basic concept of this invention effects a combination of a precision ground ball stud element with a molded cup bearing means therefor, the cup bearing being formed in place on the ball. The cup bearing preferably is built up of a number of layers of flexible material, several of which may be impregnated with a phenolic resin composition, the several laminations being selected to produce the desired characteristics. Such a laminated cup bearing means may include a layer of cotton netting material impregnated with a graphite or other lubricant which netting is adapted to be positioned next to the ball then a layer of flannel impregnated with resin covers the netting with the pile surface of the flannel turned toward the ball such that the pile fills in the apertures in the netting. These layers are then covered with a strengthening layer of canvas impregnated with resin which is adapted to back up the entire laminated structure. After the several layers of each of the cup members are assembled the uncured phenolic impregnated elements may be given a preliminary shape to hold the laminated structure together, and then the preformed cup elements may be laid in place on the ball and subjected to heat and pressure to be molded to the exact shape of the ball.

With respect to the ball stud member, it is first machined to a fairly close tolerance and then the ball element is heat treated to provide a hardened bearing surface. Thereafter the heat treated ball is subjected to a grinding, honing, or polishing operation to produce an exact sphere, which operation is performed solely for the purpose of producing a highly polished finish on the spherical ball. However, in order to speed up the commercial production and thus realize economies in the production thereof the finished tolerances with respect to the diameter of the sphere need not be held to a very exact range since the cup bearings are in effect custom fitted to the ball stud.

The completed ball and socket joint may be loaded with an additional lubricant if desired and sealed permanently and then the completed ball joint is ready for use in any application wherein a ball joint bearing may be used. This construction, however, finds special use in automotive suspension systems and particularly in the front end suspension and steering linkage means.

An example of the preferred embodiment of this invention is shown in the drawings wherein.

As stated above the present invention is well adapted to use in automobile suspensions and especially the front end suspension. This adaptability results from the fact that when ball joint bearings are used, several critical alignment problems inherent in conventional bearing structures are eliminated. Ball joint bearings are ideally suited to sustain the heavy loads to which such bearings are subjected because a relatively large bearing surface area can be provided. Ball joint bearing means constructed as here taught are also particularly adapted to be fitted into the steering system of automotive suspensions since the degree of friction within the bearing means can be controlled by the selection of the metals used for the ball and housings and the manner in which the socket element is cured on the ball. Any desired characteristics can be designed into the ball joint in this respect to accommodate the different types of loads which must be sustained and transmitted through the various elements of the steering linkage and wheel supporting mechanism. Further such bearing means can be constructed with suitable sound deadening layers built in whereby to minimize the transmission of noise through the front end suspension in a quite simple, self-contained type of structure. Also as suggested above, the bearing may be permanently lubricated and sealed in order to eliminate the necessity for frequently servicing such parts.

Figure 1:
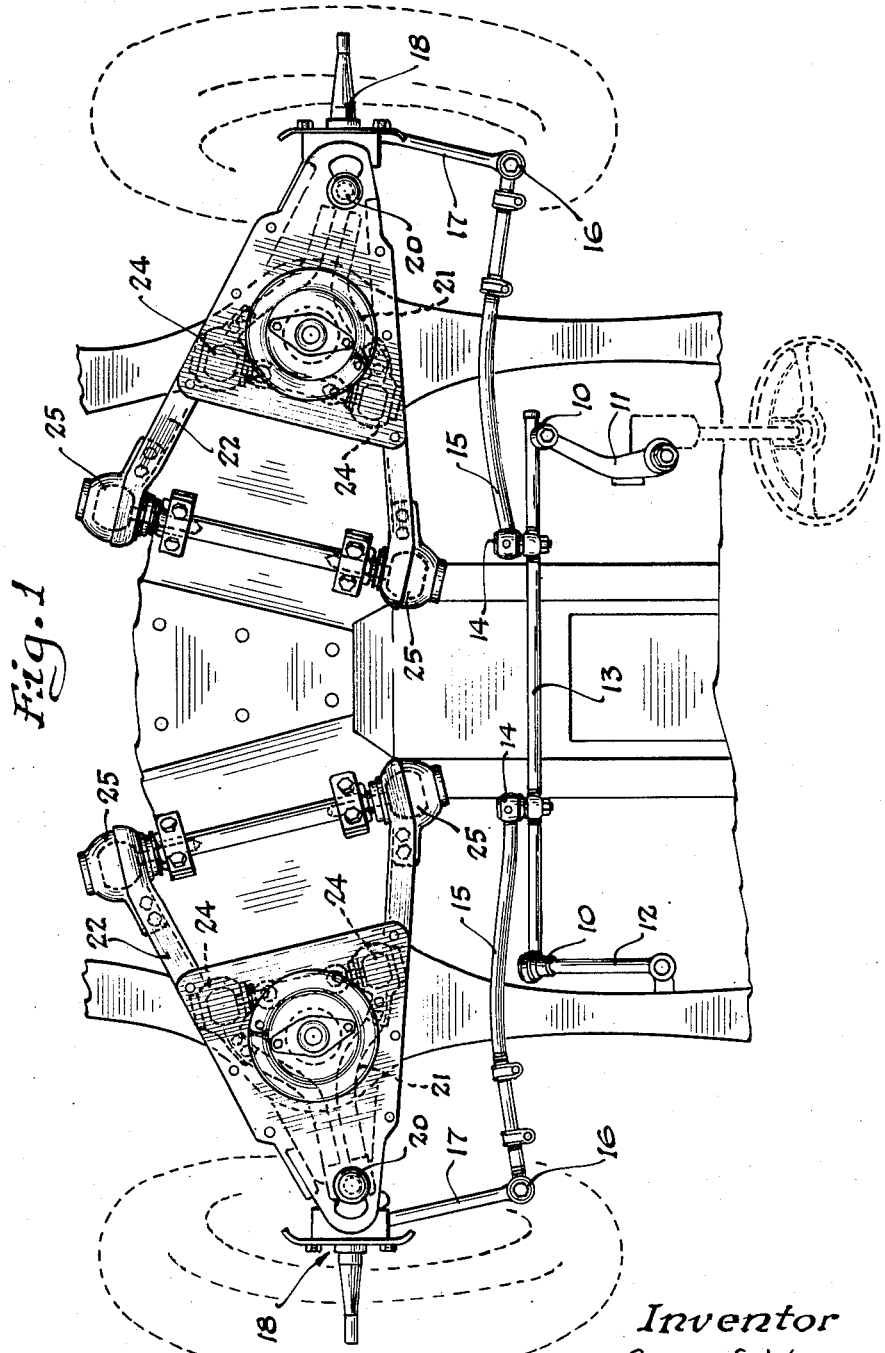
Fig. 1 is a bottom plan view of a conventional independent front wheel suspension of an automobile, which suspension has several ball joints incorporated therein following the teaching of the present invention.

The ball joint structure of this invention is shown mounted in the several joints of an independent front wheel suspension and referring particularly to Fig. 1, a pair of relatively light load sustaining ball joint bearings 10 may be disposed at the ends of each of the steering pitman 11, and idler lever 12 to support the steering connecting rod 13. Intermediate the ends of the steering connecting rod, a similar pair of the light load sustaining ball joint bearings 14 may be disposed which cooperate with the inner ends of the cross tube members 15, the outer ends of which are provided with similar ball joints 16 that connect onto the steering knuckle lever arms 17.

Figure 2:
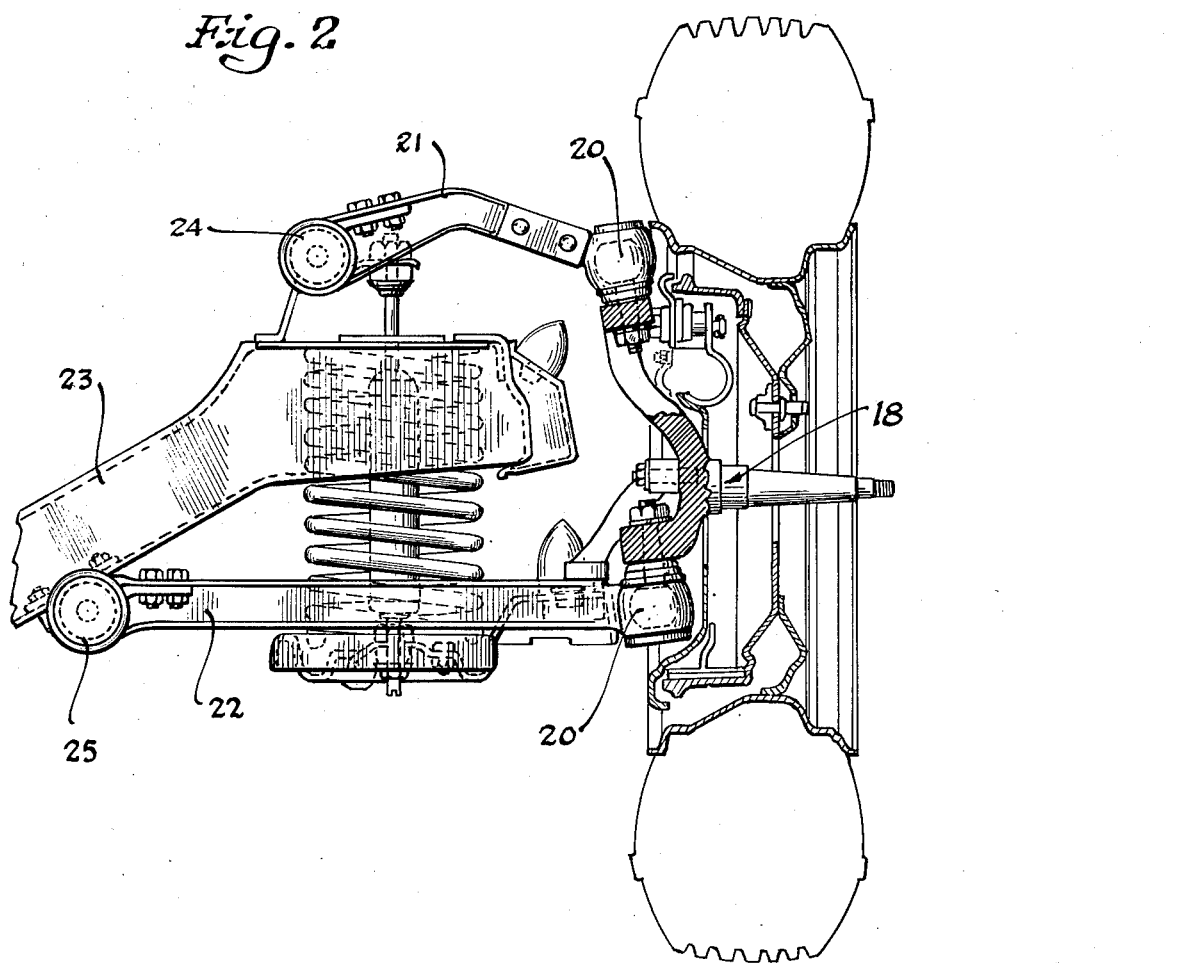
Fig. 2 is a front elevation of one of the independent wheel suspensions shown in Fig. 1.

The steering knuckles 18 each carry suitable spindles for supporting the front wheels and at their inner sides as best seen in Fig. 2, the knuckles 18 are each supported by relatively heavy load sustaining ball joint bearing members 20 which cooperate with the upper support arms 21 and the lower support arms 22 at their outer ends. It will be noted that support arms 21 and 22 form an independent or wishbone type of front wheel support. At their inner ends, the upper and lower support arms 21 and 22 are each carried from a chassis support member 23 by a pair of similar heavy load bearing ball joints 24 and 25 respectively which coact between the chassis member 23 and the ends of the support arms.

All of these ball joint structures may be made as permanent assemblies with their respective cooperating parts but preferably the several elements of the joint are removably attached to said parts so that some adjustment is provided and so they may be replaced if worn or defective.

The structure of the ball joints 10, 14, 16, 20, 24, and 25 may be generally the same except of course that the lighter load bearing joints 10 may be made somewhat smaller. Also as will appear more fully below, the frictional characteristics of the joints may be controlled by modifying the basic structure and by varying the conditions for curing the molded phenolic cup members in order to condition these bearings for the specific use to which they may be put.

Figure 3:
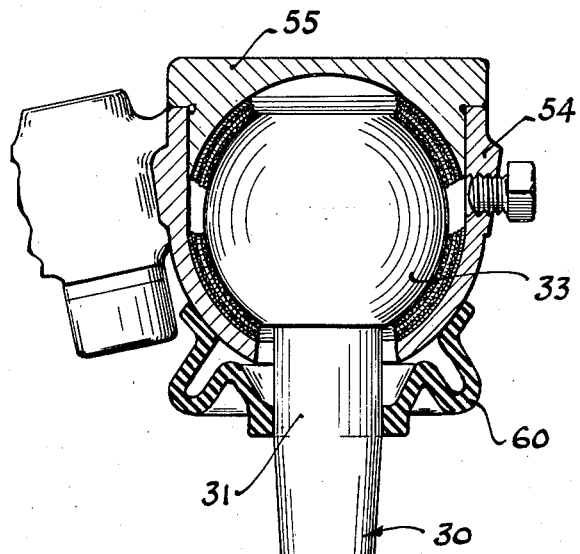
Fig. 3 is a view partly in section showing the internal structure of the ball joint.

Referring now to Figs. 3, 4, 5 and 6 the new bearing structure forming the subject of this invention is shown and it is best illustrated in connection with the larger ball joints 20, 24 and 25 which are adapted to sustain the heavier loads. The ball stud 30 of such a bearing is first formed by accurately machining the shank portion 31, threads 32, and the ball element 33. These operations are all performed in accordance with well known commercial practice and the machined portions may be finished to conventional tolerances. It will be noted that the shank shown in Fig. 3 is adapted for the ball joint 20. A modified shank may be provided for bearings 24 and 25 by which the ball elements may be mounted in their supporting means so as to be longitudinally adjustable.

After the ball portion 33 is machined, it is subjected to any well known hardening process to produce the unfinished bearing surface on it, whereupon the hardened surface may then be ground, honed or polished to have an exact spherical shape. Grinding and polishing steps are well known that are capable of producing such a surface and shape, however, in completing the finishing operation in accordance with this teaching, only a sufficient surface treatment is given the ball element as is necessary to form an exact sphere and produce a 4 to 6 micro-inch finish thereon. Hereinafter, the words grinding, honing, or polishing are used as synonymns and no critical distinction is to be implied.

Since the ball element 33 is first turned to size with commercial tolerances some actual variation in finished ball sizes is inevitable and considerable accuracy would be required to custom fit bearing sockets to these balls in order to properly fit each bearing having the somewhat varying dimensions. In following the present teaching, however, this presents no difficulty as the bearing cups are molded onto the ball with which they are to be used and thus an absolutely accurate and intimate fit is obtained.

Figure 4:
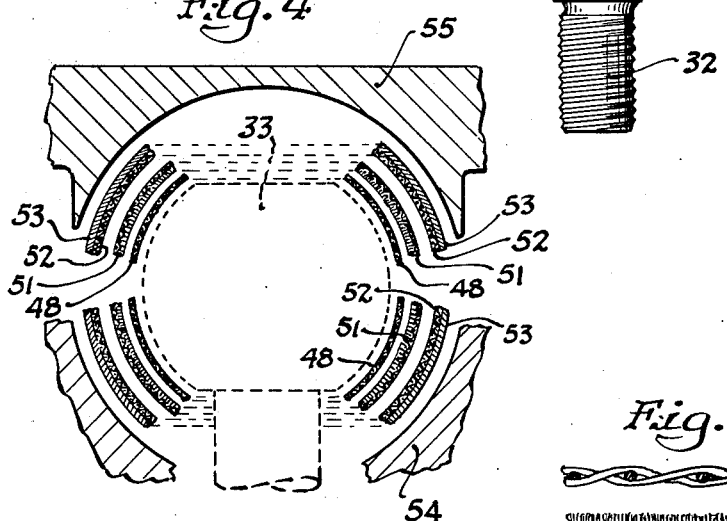
Fig. 4 is an exploded view of the bearing structure shown in Fig. 3.
Figure 5:
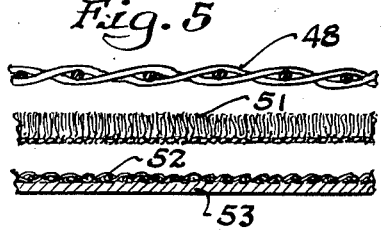
Fig. 5 is a diagrammatic view of the several laminations which are assembled to form the preferred form of the bearing means.
Figure 6:
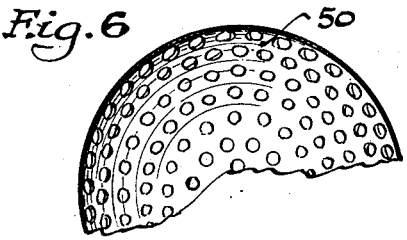
Fig. 6 is an enlarged detailed perspective of an open faced Oilite bearing surface which may be used in one form of the invention.

The bearing cups adapted to be used with the heavy duty ball joint 20 are preferably formed of the several laminations best shown in the exploded view of Fig. 4. The layer 48 closest to the ball 33 is preferably a cotton netting 48 as shown in Fig. 5 which may be impregnated with a graphite lubricant, the netting being preferably formed with about 6 to 16 threads per inch and being loaded with from about 10 to 30 percent by weight of graphite. The layer 48, however, may take the form of a pierced Oilite bearing 50 stamped out of a relatively light weight sheet to have an open faced bearing surface, as shown in Fig. 6.

The second layer 51 of the laminated bearing structure is preferably formed of about 12 ounce cotton flannel material which is impregnated with a postsettable material such as phenolic resin. The impregnated flannel may also be cut to a desired pattern to be preformed to approximately fit the surface of ball 33. The flannel layer is positioned over the netting 48 or Oilite layer 50 with the pile side of the flannel toward the ball. In lighter load sustaining applications it may be satisfactory to back up the Oilite bearing layer with a canvas phenolic impregnated sheet and thus eliminate the flannel layer.

In the preferred structure, the flannel layer is used and a third layer 52 is provided which may be either a single sheet of phenolic impregnated cotton duck of about 6 to 10 ounce material or it may take the form of such a layer of canvas having a backing layer of neoprene 53 adhered thereto.

The socket member is preferably formed as two separate elements referring to Fig. 3 comprising a top half and a bottom half and depending upon the position of the ball joint in the suspension, the neoprene layer may be disposed either at the top or bottom of the housing referring to the position of the elements as shown in Fig. 3 whereby the load may be transmitted between the housing and ball through the neoprene in the best manner to minimize the transmission of noise.

Also, the several layers forming each half section may be assembled as a preliminary to completing the ball joint to make preformed parts that may be easily positioned within the housing and on the ball 33 prior to the molding operation. The preformed sections may be subjected to relatively low temperatures and a very light molding pressure to temporarily form the half sections without substantially curing the phenolic impregnant so that subsequently the parts may be brought together with the housing and ball to be subjected to heat and pressure to mold the sections to the exact form of the ball.

The several elements forming the ball joint are adapted to be enclosed in a housing having a lower portion 54 and a cap portion 55. The housing elements are shaped to receive the preformed cup members and may be formed integral with certain of the elements of the steering linkage system. Preferably, however, the housing elements of the ball joint assembly are made separable therefrom to permit replacement of a worn ball joint if necessary.

To complete the ball joint, the two half sections of the bearing cup means are placed in their respective housing elements 54 and 55 and may be cemented thereto with any well known thermosetting material such as Cyclo-Bond. Then the ball stud may be assembled with the housing, the ball preferably being subjected to a preliminary heating step to bring its temperature up to near the curing temperatures for the phenolic, without destroying any of the effects of the heat tempering processing performed to harden the bearing surface on the ball.

The top and bottom housing members 54 and 55 with their assembled cup bearing members are then clamped upon the ball element to establish a preselected pressure of approximately 2,000 lb./sq. in. between the parts. When this pressure is attained, the housing elements may be permanently joined together and the entire assembly may then be subjected to a temperature of from about 300° to 350° F. for a time period of about five minutes to cure the phenolic resin in the several layers which make up the socket element. Due to the degree of pressure used, and the structure of the laminated material, the socket element is compressed onto the ball and formed to an exact fit with the pile fibres of the flannel reaching through the spaces of the layer 48 to engage against the ball whereby to form a firm phenolic bearing support for the ball while the netting 49 or Oilite 50 assists in carrying the necessary lubricant. The canvas backing cooperates with the layer 48 and flannel layer to strengthen the socket bearing element and when the neoprene layer 53 is bonded to the canvas during the formation of the socket member, a suitable resilient backing is provided to firmly press the socket member against the ball in order to continuously exert a proper pressure between the socket bearing surface of the ball to compensate for wear during normal usage.

When such a structure is provided, desired frictional characteristtics are imparted to the ball and socket bearing in order to hold the steering system stable when such ball joints are used. The degree of pressure between the socket and ball may also be controlled to a certain extent by controlling the shrinkage of the layers forming the laminated bearing cups by varying the temperature and pressure conditions used for curing the phenolic resin and by a selection of the type and weight of the duck material used for the outer layer of the laminated structure. To a more limited extent the degree of shrinkage may be determined by the characteristics of the woven portion of the flannel material. The control of shrinkage is accomplished by selecting these materials to produce a predetermined degree of shrinkage during the curing process all as is well known in following conventional curing techniques.

The ball joint constructed in accordance with this teaching may be designed to have unusual load bearing characteristics in that the phenolic resin material is adapted to support all loads normally encountered in automotive types of suspensions while at the same time the frictional relationships between the ball and the socket may be controlled to produce a stable steering mechanism without unduly restricting the movement of the linkage so as to make steering difficult. The layer 48 serves to lubricate the moving surface of the ball joint and after completion of the curing process, additional high pressure lubricants can be forced into the housing if desired and the housing can be permanently sealed so that further lubrication during the normal life of the ball joint will not be required. With such a permanently closed type of structure, a suitable seal 60 may be provided to eliminate any possibility of dust or other foreign material entering the housing and as shown, this seal may take the form of a flexible neoprene boot which may be permanently sealed to the housing and to the stud 31 of the ball with a material such as Cyclo-Bond, in a manner so as not to interfere with the relative motion of the ball within the socket and housing.

When two such ball joints 20 are provided and are disposed substantially in line to provide in effect a king pin bearing, it is apparent that alignment problems are eliminated. The ball jonts are universal joints in effect and no friction is created in the steering system as might otherwise be present if the conventional king pin type bearing were used and some misalignment were present.

Similarly, alignment problems are eliminated in mounting the upper and lower support arms 21 and 22 on the chassis member 23 so that all harshness of the movement of the wishbone suspension is eliminated as compared with a similar suspension wherein conventional bearings are used which might be slightly out of line.

In the remainder of the steering linkage, it is essential that friction be minimized as much as possible and for this purpose relatively light weight ball joint structures may be used which have been constructed in accordance with this teaching. For this purpose, however, the frictional engagement between the socket element and the ball member should be minimized and thus the laminated socket bearing element is cured under such conditions as to generate just the proper pressure to produce an exact fit between the ball and socket members. Since the loads transmitted through this part of the steering system are not of such a high degree, these structures may be made somewhat smaller but at the same time, they may be made to have a permanent lubricant sealed in so that the entire steering linkage including the supports for the wheels may be permanently lubricated requiring no further servicing during the normal life expectancy of the bearings.

While these structures have been described in connection with the steering mechanism of an automobile wherein the advantages inherent in their structure may be more fully utilized, it is apparent that the invention is not limited to such constructions. The ease of manufacture wherein the spherical ball element may be expeditiously produced on a commercial grinding set up and a spherical socket can be made having an exact fit for cooperating therewith, makes possible substantial economies in the manufacturing of the completed assembly. This is true because, the ball element may be accurately ground by known machines yet it is relatively difficult to grind such a sphere to an exact diameter. Even if this were possible the structure could be completed only by making a precision ground cup seat for cooperating therewith which would likewise have to be formed to an exact dimension in order to provide a satisfactory precision ground cup bearing. However, in following this teaching it is not necessary to hold the spherical ball member to any exact dimension and thus it may be produced quickly by the most economical grinding process consistent with the production of the necessary finish. Then the cup bearing elements may be quickly and cheaply molded in place on the ball so that an exact fit is provided which accomplishes the necessary cooperation between the ball and its seat.

Such a ball joint structure may be used for carrying the rear wheels of an automobile by independent support means and it is obvious that this invention will find other uses where an inexpensive ball joint structure could be used. It is apparent therefore that the disclosure contained herein is by way of example only and is not intended to limit the invention other than within the scope of the following claims.

I claim:

1. The method of forming a joint bearing structure, which includes the steps of, placing a member shaped to a desired form which is made from a material that will soften and then become cured when heated in the space between two truncated spherical surfaces of different radii, applying a pressure on said surfaces and the member to have one surface of the material accurately conform to a surface mated therewith, and applying heat to said assembly in the presence of said pressure for shaping said member exactly to said surface which shape will be retained thereafter when the member is cured by said heat.

2. The method of forming a bearing structure, which includes the steps of, placing a member made from a material which will soften and become cured when heated in contact with a bearing surface of predetermined configuration, applying pressure on the member to force it against said surface, and applying heat to the member in the presence of said pressure for shaping it exactly to said surface, which shape will be retained thereafter when the member becomes cured.

3. The method of forming a joint bearing structure, which includes the steps of, placing a member having a layer of low friction material backed by a material which will soften and become cured when heated in the space between an element having a truncated spherical surface and a housing surrounding said surface, applying pressure to the member to force the low friction material against said surface, and applying heat to the member in the presence of said pressure for shaping the member to conform the layer of low friction material exactly to said surface, which shape will be retained thereafter when the material becomes cured.

4. A ball and socket bearing assembly comprising a ball member having a truncated spherical shape of fine finish, a plurality of bearing elements disposed about said ball, a two-piece socket member encompassing said bearing elements and clamped thereon so as to exert a pressure on the bearing elements to maintain them in engagement with the ball, said bearing elements having a plurality of laminations with a low friction layer adjacent the surface of the ball, said elements being impregnated with a resin which will soften when heated to conform the low friction layer exactly to the surface of the ball and become cured to retain the low friction layer in intimate engagement with the ball.

5. The method of forming a bearing structure, which includes the steps of, placing a member having a layer of low friction material backed by a material which will soften and then become cured when heated in the space between an element having a bearing surface of predetermined configuration and a housing surrounding said surface, applying pressure to the member to force the low friction material against said surface, and applying heat to the member in the presence of said pressure for shaping the member to conform the layer of low friction material exactly to said surface, which shape will be retained thereafter when the material becomes cured.

6. The method of forming a bearing structure which includes the steps of, placing a member made from a material which will soften and become cured when heated between an element having a bearing surface of predetermined form and a second element having a surface spaced from said first surface, and simultaneously applying heat and pressure to the member to shape it accurately to the surface of said first element while filling a substantial portion of the space between said two elements before the material becomes cured which occurs thereafter.

7. The method as set forth in claim 6, including the additional step of securing said member to said second element in fixed relation thereto.

8. The method of forming a joint bearing structure as recited in claim 1, including the additional step of securing said member to said housing in fixed relation thereto.

9. The method of forming a bearing structure as recited in claim 3, including the additional step of securing said member to said housing in fixed relation thereto.

10. The method of forming a bearing structure as recited in claim 1, including the additional step of providing resilient material between said conformed member and said housing.

References Cited in the file of this patent

UNITED STATES PATENTS

| | | |
|---|---|---|
| 1,054,265 | Baekeland | Feb. 25, 1913 |
| 1,828,358 | Chryst | Oct. 20, 1931 |
| 1,909,430 | Skillman | May 16, 1933 |
| 1,929,836 | Brown | Oct. 10, 1933 |
| 2,027,560 | Skillman | Jan. 14, 1936 |
| 2,162,890 | Horne | June 20, 1939 |
| 2,325,845 | Flumerfelt | Aug. 3, 1943 |
| 2,398,848 | Newey | Apr. 23, 1946 |
| 2,424,431 | Booth | July 22, 1947 |
| 2,556,767 | McCann | June 12, 1951 |
| 2,631,044 | Booth | Mar. 10, 1953 |

FOREIGN PATENTS

| | | |
|---|---|---|
| 1,484 | Great Britain | 1913 |